(12) United States Patent
Carothers et al.

(10) Patent No.: US 10,417,558 B1
(45) Date of Patent: Sep. 17, 2019

(54) METHODS AND SYSTEMS FOR ARTIFICIAL NEURAL NETWORK OPTIMISTIC EVENT PROCESSING

(71) Applicant: Deep Insight Solutions, Inc., Nashville, TN (US)

(72) Inventors: Christopher D. Carothers, Schenectady, NY (US); David W. Bauer, Jr., Leesburg, VA (US); Justin Lapre, Poestenkill, NY (US)

(73) Assignee: Deep Insight Solutions, Inc., Nashville, TN (US)

( * ) Notice: Subject to any disclaimer, the term of this patent is extended or adjusted under 35 U.S.C. 154(b) by 0 days.

(21) Appl. No.: 16/147,135

(22) Filed: Sep. 28, 2018

(51) Int. Cl.
  *G06N 3/04* (2006.01)
  *G06N 3/063* (2006.01)
(52) U.S. Cl.
  CPC ............. *G06N 3/049* (2013.01); *G06N 3/063* (2013.01)
(58) Field of Classification Search
  None
  See application file for complete search history.

(56) References Cited

U.S. PATENT DOCUMENTS

| | | | |
|---|---|---|---|
| 7,321,882 B2 | 1/2008 | Jaeger | |
| 9,811,775 B2 | 11/2017 | Krizhevsky et al. | |
| 10,067,853 B2 | 9/2018 | Kumar | |
| 2013/0073497 A1* | 3/2013 | Akopyan | G06N 3/049 706/27 |

(Continued)

FOREIGN PATENT DOCUMENTS

WO  2015/184729 A1  12/2015

OTHER PUBLICATIONS

Wolfe, Noah, Christopher D. Carothers, Misbah Mubarak, Robert Ross, and Philip Carns. "Modeling a million-node slim fly network using parallel discrete-event simulation." In Proceedings of the 2016 ACM SIGSIM Conference on Principles of Advanced Discrete Simulation, pp. 189-199. ACM, 2016 (Year: 2016).*

(Continued)

*Primary Examiner* — Alexey Shmatov
*Assistant Examiner* — Oluwatosin O Alabi
(74) *Attorney, Agent, or Firm* — Andre J. Bahou; Christopher T. McNeill; Waller Lansden Dortch & Davis, LLP

(57) ABSTRACT

A computer-implemented method is disclosed. The method may include receiving, at a neuron of an artificial neural network, a sequence of synapse messages. Each synapse message may include a timestamp of the time the synapse message was sent. The method may include determining, based on the timestamp of each synapse message, whether the neuron processed the sequence of synapse messages out of order with respect to the timestamps. The method may include, in response to the neuron processing the sequence of synapse messages out of order, reverse-computing at least one computation performed by the neuron in response to processing the sequence of synapse messages out of order. The method may include performing the at least one computation based on receipt of the sequence in a correct order as determined by the timestamp of each synapse message in the sequence of synapse messages.

20 Claims, 8 Drawing Sheets

(56) References Cited

U.S. PATENT DOCUMENTS

2014/0114893 A1* 4/2014 Arthur .................. G11C 11/54
706/25
2018/0189231 A1 7/2018 Fleming, Jr. et al.

OTHER PUBLICATIONS

Plagge, M., Carothers, C. D., & Gonsiorowski, E. (May 2016). NeMo: A Massively Parallel Discrete-Event Simulation Model for Neuromorphic Architectures. In Proceedings of the 2016 ACM SIGSIM Conference on Principles of Advanced Discrete Simulation (pp. 233-244). ACM. (Year: 2016).*
Mark Plagge, Christopher Carothers, & Elsa Gonsiorowski, "NeMo: A Massively Parallel Discrete-Event Simulation Model for Neuromorphic Architectures" SIGSIM-PADS '16 Proceedings of the 2016 ACM SIGSIM Conference on Principles of Advanced Discrete Simulation, May 15 2015, pp. 233-244, ACM New York, NY, USA.
Kevin G Kirby, "Context dynamics in neural sequential learning", Proc. Florida AI Research Symposium, Apr. 1991, p. 66-70.
"Echo state network", http://www.scholarpedia.org/article/Echo_state_network. The publication date is unknown, but the edit history of the webpage indicates portions of the webpage have existed since Nov. 2, 2006 and has been subsequently edited. The date of the last edit was May 10, 2018. Last accessed Dec. 19, 2018.
Diehl et al. "Conversion of Artificial Recurrent Neural Networks to Spiking Neural Networks for Low-power Neuromorphic Hardware." arXiv. Jan. 16, 2016. arXiv:1601.04187 [cs.NE]. Cornell University.
Bauer Jr, David W. Meta-simulation design and analysis for large scale networks. Diss. Rensselaer Polytechnic Institute, 2005.

* cited by examiner

METHODS AND SYSTEMS FOR ARTIFICIAL NEURAL NETWORK OPTIMISTIC EVENT PROCESSING

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present disclosure relates generally to artificial neural networks, and more particularly to artificial neural network optimistic event processing.

Conventional artificial neural network implementations use a synchronous, event-driven framework to perform training, inference calculations, or other functions. Because of the synchronous nature of the calculations, signals destined for the neurons of the artificial neural network are processed before a subsequent iteration of neuron calculations. This synchronous process may be slow due some neurons waiting for other neurons to finish their calculations before proceeding.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure includes a computer-implemented method. The method may include receiving, at a neuron of an artificial neural network, a sequence of synapse messages. Each synapse message may include a timestamp of the time the synapse message was sent. The method may include determining, based on the timestamp of each synapse message, whether the neuron processed the sequence of synapse messages out of order with respect to the timestamps. The method may include in response to the neuron processing the sequence of synapse messages out of order, reverse-computing at least one computation performed by the neuron in response to processing the sequence of synapse messages out of order. The method may include performing the at least one computation based on receipt of the sequence of synapse messages in a correct order as determined by the timestamp of each synapse message in the sequence of synapse messages.

Another aspect of the disclosure includes a computer-implemented method. The method may include receiving, at a neuron of an artificial neural network, a sequence of synapse messages. Each synapse message may include a timestamp of the time the synapse message was sent. The neuron may be configured to produce a correct output when the neuron processes the synapse messages in a correct order with respect to the timestamps of the synapse messages. The method may include determining, based on the timestamp of each synapse message, whether the neuron processed the sequence of synapse messages out of order with respect to the timestamps. The method may include, in response to the neuron processing the sequence of synapse messages out of order, determining whether an output produced by the neuron in response to processing the sequence of synapse messages out of order differs from the correct output. The method may include, in response to the output produced by the neuron differing from the correct output, reverse-computing at least one computation performed by the neuron in response to processing the sequence of synapse messages out of order. The method may include performing the at least one computation based on receipt of the sequence of synapse messages in the correct order to produce the correct output.

One aspect of the disclosure includes a system. The system may include at least two neuron logical processes. Each neuron logical process may include a neuron of an artificial neural network. The system may include at least two processor devices. Each processor device may be in data communication with at least one other processor device of the at least two processor devices. Each processor device may include at least one neuron logical process executing on the processor device. In some embodiments, each neuron logical process, when executed by the processor device, may be configured to receive a first synapse message. The first synapse message may include a voltage. Each neuron logical process may be configured to adjust a membrane potential of the neuron based on the voltage of the synapse message. Each neuron logical process may be configured to determine whether the membrane potential of the neuron exceeds a threshold membrane potential of the neuron. Each neuron logical process may be configured to, in response to the membrane potential of the neuron exceeding the threshold membrane potential, produce an output. The output may include a firing message. The neuron may produce the output without receiving a second synapse message from a connecting, upstream synapse.

Numerous other objects, advantages and features of the present disclosure will be readily apparent to those of skill in the art upon a review of the following drawings and description of the various embodiments. As will be seen, in response to the non-conventional steps, functions, components, and the like of the present embodiments, the artificial neural networks described herein may improve the functionality of a computing device.

DETAILED DESCRIPTION

Figure 1:
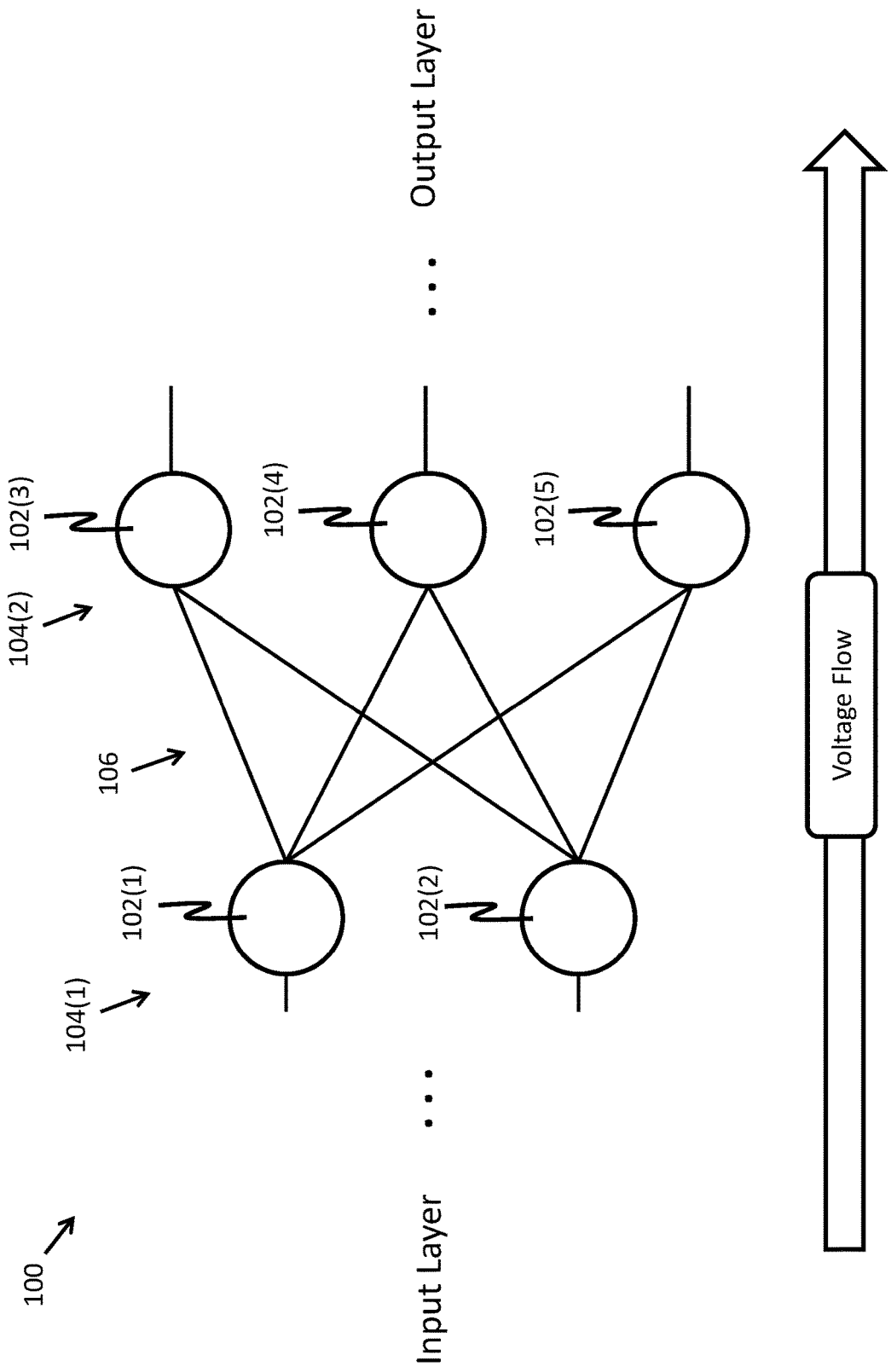
FIG. 1 is a schematic block diagram depicting one embodiment of an artificial neural network.

FIG. 1 depicts one embodiment of a portion of an artificial neural network (ANN) 100. The ANN 100 may include a multi-layer perceptron (MLP), a deep belief network, a recurrent neural network (RNN), a convolutional neural network (CNN), spiking neural network (SNN), or the like. In one embodiment, the ANN 100 may include a plurality of neurons 102 such as the neurons 102(1)-(5) of FIG. 1. As described herein, an unspecified neuron may be referred to as a neuron 102.

In some embodiments, the ANN 100 may include a plurality of layers 104 of neurons 102, such as the layers 104(1)-(2) of FIG. 1. One or more neurons 102 of the plurality of neurons 102 may be grouped a layer 104. For example, a first layer 104(1) may include the neurons 102(1)-(2), and a second layer 104(2) may include the neurons 102(3)-(5). The ANN 100 may include an input layer and an output layer (not depicted in FIG. 1). In the exemplary embodiment depicted in FIG. 1, the input layer may be located to the left layer 104(1), and the output layer may be located to the right of the layer 104(2). During use of the ANN 100, such as during training, inference calculation, or the like, voltage may flow from the input layer, through one or more hidden layers, and toward the output layer. Voltage may include output from a neuron 102, synapse 106, or another component of the ANN 100.

As used herein, a first layer 104 (and the one or more neurons 102 of that layer) may be deemed "downstream" from a second layer 104 in response to the second layer 104 being disposed between the input layer and the first layer 104. For example, the first layer 104 may include the layer 104(2) and the second layer 104 may include the layer 104(1). Thus, the first layer 104(2) may be downstream of the layer 104(1). As used herein, a first layer 104 may be deemed "upstream" from a second layer 104 in response to the first layer 104 being disposed between the input layer and the second layer 104. For example, the first layer 104 may include the layer 104(1) and the second layer 104 may include layer 104(2). Thus, the layer 104(1) may be upstream from the layer 104(2).

In one embodiment, the ANN 100 may include a plurality of synapses 106. A synapse may connect a neuron 102 of one layer to a neuron 102 of another layer. For example, a synapse of the plurality of synapses 106 may connect the neuron 102(1) to the neuron 102(3). In some embodiments, a synapse may include a weight. The weight may include a value that adjusts a voltage that travels through the synapse. Adjusting the voltage based on the weight may include multiplying the voltage by the weight, or the like. In one embodiment, a first neuron 102(1) may connect to each neuron 102(3)-(5) of the layer immediately downstream from the first neuron. In some embodiments, the first neuron 102(1) may connect to a subset of the neurons 102(3)-(5) of the layer immediately downstream from the first neuron.

In one embodiment, a neuron 102 may include a membrane potential. The membrane potential may include the current amount of voltage stored in the neuron 102. A voltage integration function of the neuron 102 may calculate the membrane potential of the neuron 102. The voltage integration function may use as input one or more voltage amounts received from connected upstream synapses. The voltage integration function may use as input the current membrane potential of the neuron 102. The voltage integration function may use one or more random values as input. The output of the integration function may include a new membrane potential of the neuron 102. As an example, the integration function may include (output value)=(current membrane potential)+(voltage amount from synapse)+(random value). In some embodiments, the integration function may include a linear function, a sigmoid function, or the like.

As an example, the neuron 102(3) may receive voltage from the neuron 102(2) through a connecting synapse of the plurality of synapses 106. The connecting synapse may adjust the voltage from the neuron 102(2) based on the weight of the connecting synapse to generate a second voltage. The synapse may send the second voltage to the neuron 102(3). The neuron 102(3) may use the received voltage as input to the voltage integration function. For example, the current membrane potential of the neuron 102(3) may include a value of 0.6. The voltage received from the synapse may include a value of 0.2. In response, the voltage integration function may calculate the membrane potential of the neuron 102(3) to be 0.6+0.2=0.8.

In one embodiment, a neuron 102 may include a threshold membrane potential. The threshold membrane potential may include a value. In response to the membrane potential of the neuron 102 exceeding the threshold membrane potential, the neuron 102 may produce an output. The output may include a firing message. The firing message may include a voltage. The neuron 102 may send the firing message to a downstream neuron 102. The voltage of the firing message may include a numeric value resulting from the integration function, a predetermined value, or the like. In some embodiments, the threshold membrane potential of a neuron may be based on a predetermined threshold membrane potential, training, a hyperparameter search, or the like.

In one embodiment, components of the ANN 100 may communicate with each other using messages. In one embodiment, a message may include a timestamp. The timestamp may include the time the message was generated, sent, or the like. The timestamp may include a date and time (e.g. "1 Jan. 2018 14:03:37"), a time since the beginning of executing the ANN 100, or the like. The timestamp may include a timestamp from a computing device that generates the message, a timestamp from an overarching computing system that schedules, coordinates, or the like the components of the ANN 100. In some embodiments, a message may include a value. For example, in one embodiment, a message from a synapse (i.e. a "synapse message") may include the value of the voltage received by the synapse that has been adjusted based on the weight of the synapse.

Figure 2:
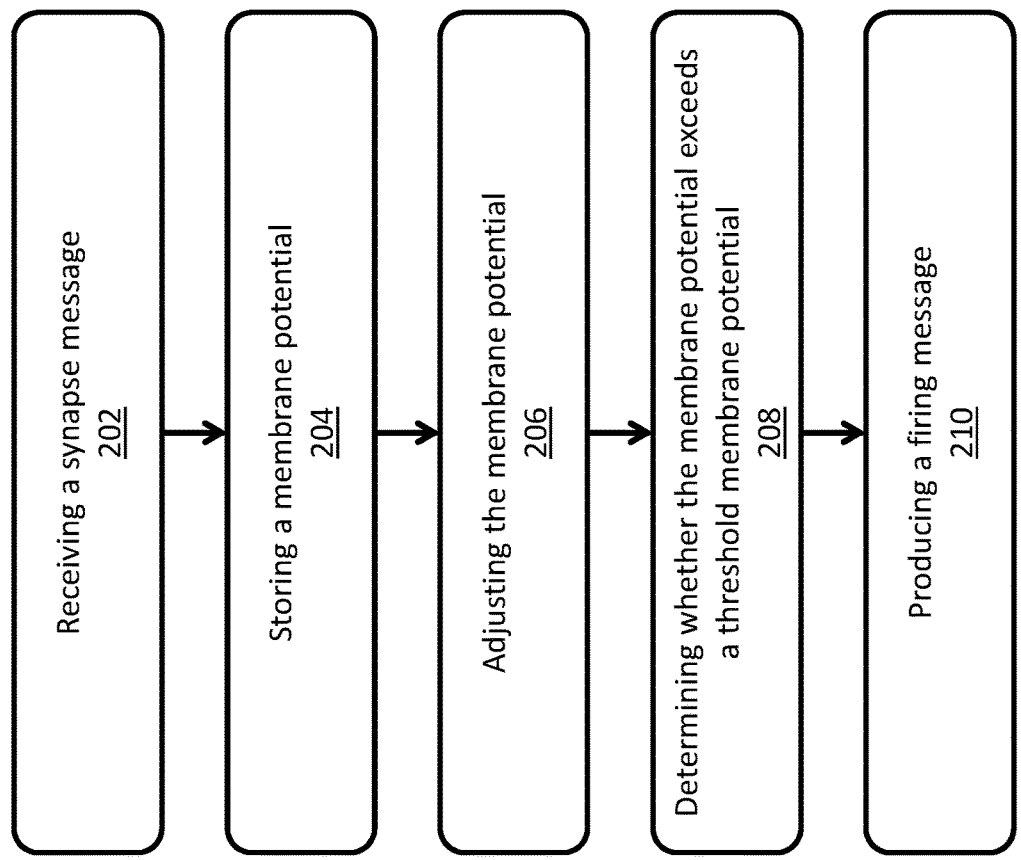
FIG. 2 is a flowchart block diagram illustrating one embodiment of a method for artificial neural network optimistic event processing.

FIG. 2 depicts one embodiment of a method 200. The method 200 may include a computer-implemented method. The method 200 may include a method for artificial neural network optimistic event processing. In one embodiment, the method 200 may include receiving 202 a synapse message. A neuron may receive the synapse message. In some embodiments, the neuron may store the received synapse message. The neuron may store one or more received synapse messages in a sequence in which they arrive, in which the neuron processes the synapse messages, or the like. Storing the one or more synapse messages in the sequence may allow the neuron to perform reverse computations as explained below.

In one embodiment, the method 200 may include storing 204 a membrane potential of the receiving neuron. The membrane potential may include the membrane potential of the neuron prior to receiving or processing the synapse message. In some embodiments, the storing 204 the membrane potential may include associating the stored membrane potential with the received synapse message. Storing 204 the membrane potential may include storing the membrane potential value in a data structure or the like.

In one embodiment, the method 200 may include adjusting 206 the membrane potential of the neuron. Adjusting 206 the membrane potential may be in response to receiving the synapse message, a sequence of synapse messages, or the like. In one embodiment, adjusting 206 the membrane potential of the neuron may include executing the voltage integration function of the neuron. The receiving neuron may use a voltage value included in the synapse message, sequence of synapse messages, or the like as input for the neuron's integration function. In one embodiment, adjusting 206 the membrane potential may include adding a random amount to the membrane potential. Adding a random amount to the membrane potential may include using a randomly generated value as part of the voltage integration function.

In some embodiments, the method 200 may include adjusting the membrane potential of the neuron based on a leak voltage amount. The neuron may include a leak function that calculates the leak voltage amount. Adjusting the membrane potential of the neuron based on the leak voltage amount may include adding the leak voltage amount to the membrane potential of the neuron.

The leak function may include calculating a leak value amount. The leak value amount may include a constant value, a value that may change each time the leak function executes, or the like. In one embodiment, the leak value amount may include a negative value. Whether the leak value amount includes a positive value, a negative value, or a zero value may be based on random number generation. In one embodiment, the leak function may include calculating a time difference between the current time and a time the neuron last produced a firing message. In some embodiments, the neuron may calculate the time difference in response to the neuron receiving a synapse message, receiving another type of message, a timer elapsing, or the like. In one embodiment, the leak function may include calculating a leak voltage amount. The leak voltage amount may be based on the time difference. In some embodiments, the leak voltage amount may include multiplying the leak value amount by the time difference. For example, in one embodiment, the time difference may be 2 and the leak value amount may include a value of 1.2. Thus, the leak voltage amount may include a value of 2.4.

In one embodiment, the neuron may execute the leak function without the neuron receiving a synapse message. In another embodiment, the neuron may execute the leak function in response to receiving a synapse message. In some embodiments, the neuron may execute the leak function in response to receiving another type of message, in response to a timer expiring, or the like. For example, in one embodiment, in response to adjusting 206 the membrane potential of the neuron, the neuron may execute the leak function or may set a timer to execute the leak function in response to the timer expiring.

In some embodiments, the method 200 may include determining 208 whether the membrane potential exceeds a threshold membrane potential of the neuron. The determining 208 may be in response to a predetermined amount of time expiring since adjusting 206 the membrane potential of the neuron. The predetermined amount of time may include a time interval, a number of processor cycles, or another way to track time.

In one embodiment, in response to the membrane potential exceeding the threshold, the method 200 may include producing 210 a firing message. In some embodiments, producing 210 the firing message may include the neuron producing an output. In one embodiment, in response to producing 210 the firing message, the method 200 may include reducing the membrane potential of the neuron.

For example, in one embodiment, a synapse message may include a voltage sent from a first neuron 102(1) to a second neuron 102(3) that has been calculated using the weight of the synapse. The timestamp of the synapse message may include the time the synapse message was sent. The neuron 102(3) receiving the synapse message may store its current membrane potential. The neuron 102(3) may use the voltage of the synapse message as input for its integration function. In one embodiment, in response to the integration function of the neuron 102(3) resulting in a membrane potential that exceeds the threshold membrane potential of the neuron 102(3), the neuron 102(3) may fire. In response to the neuron 102(3) firing, the neuron may send a firing message to each connecting downstream synapse.

In some embodiments, producing 210 the firing message may include producing the firing message without receiving a second synapse message from a connecting, upstream synapse. A neuron may connect with multiple upstream synapses. The neuron may receive one or more synapse messages from these upstream synapses at different times. Receiving each synapse message may be similar to the step of receiving 202 the synapse message. The neuron may adjust its membrane potential based on the received one or more synapse messages, which may be similar to the step of adjusting 206 the membrane potential. The neuron may determine whether its membrane potential exceeds its threshold membrane potential, which may be similar to the step of determining 208 whether the membrane potential exceeds the threshold membrane potential. The neuron may make this determination even though it may not have received a synapse message from every connected upstream synapse. The neuron may make this determination even though other neurons in the same layer may not have received one or more synapse messages from their respective connected upstream synapses.

In one embodiment, producing 210 the firing message may include scheduling the firing message to be sent at a later time. Scheduling the firing message may not include generating the firing message immediately after the determining 208. In some embodiments, an ANN (such as the ANN 100) may be configured such that multiple neurons may send their respective firing messages (in response to a neuron's membrane potential exceeding its threshold membrane potential) at substantially the same time. This may aid the ANN in having at least a portion of the firing messages arrive at their respective destinations in a correct order as indicated by their respective time stamps. In one embodiment, a random value may be added to the firing message time interval or the synapse message time interval. The random value may prevent two or more messages from arriving at a component of the ANN simultaneously. Preventing simultaneous arrival of messages may prevent ambiguity when performing reverse-computations, or the like as explained below.

In some embodiments, the method 200 may include, in response to producing 210 a firing message, resetting the membrane potential of the neuron. In one embodiment, resetting the membrane potential of the neuron may include reducing the membrane potential of the neuron by a predetermined amount. The predetermined amount may include an amount derived from training, a hyperparameter search, or a user configuration.

In some embodiments, the method 200 may include determining whether the membrane potential of the neuron is below a second threshold membrane potential. The second threshold membrane potential may be called a "negative threshold," a "reset threshold," or the like. Determining whether the membrane potential of the neuron is below the negative threshold may be in response to producing 210 the firing message, in response to the neuron performing the leak function, or the like. In response to the membrane potential being below the second threshold membrane potential, the method 200 may include setting the membrane potential of the neuron to a predetermined membrane potential, adding a predetermined value to the membrane potential, or the like.

In one embodiment, the method 200 may include scheduling a membrane potential determination for the neuron. Scheduling the membrane potential determination may be in response to receiving 202 the synapse message. Scheduling the membrane potential determination may include selecting a later time, processing cycle, or the like to perform the determining 208 step of the method 200. In some embodiments, scheduling the membrane potential determination in response to receiving 202 the synapse message may result in the neuron determining 208 whether its membrane potential exceeds the threshold membrane potential only after the neuron has received a synapse message. Scheduling the membrane potential determination may include scheduling the membrane potential determination in response to a membrane potential determination not already being scheduled.

In some embodiments, scheduling the membrane potential determination may result in more efficient computing resource use, which may improve the functionality of one or more computing devices executing the method 200. For example, if the neuron has not received a synapse message, the membrane potential of the neuron may not have substantially changed, and checking the membrane potential may use processing power, memory, or the like that may be used for other functions. Furthermore, in an exemplary embodiment, a time interval between a synapse scheduling a synapse message and sending the synapse message may be smaller than a time interval between scheduling a membrane potential determination and performing the membrane potential determination of the step 208 of the method 200. This may result in a neuron receiving multiple synapse messages, but only performing the step 208 once instead of for each message.

In some embodiments, the method 200 may include determining whether to remove stored data associated with the neuron. The stored data associated with the neuron may include a stored synapse message, a stored membrane potential, or other stored data regarding the neuron. Removing the stored data may free up memory, computing storage, or other resources of a processor device or computing device the neuron may be executing on so that the resources can be used for other data.

In one embodiment, determining whether to remove stored data associated with the neuron may include calculating a global time. The global time may include the time of an earliest unprocessed message in the ANN or the overarching computing system executing the ANN. In some embodiments, each component of the ANN may send the timestamp of its earliest unprocessed message to the overarching computing system. Each component may send the timestamp in response to a request received from the overarching computing system or may send the timestamp periodically. The overarching computing system may determine which received timestamp is the earliest. The global time may include the earliest timestamp.

In one embodiment, determining whether to remove stored data associated with the neuron may include the neuron receiving the global time. The overarching computing system may send the earliest received timestamp to each component of the ANN, including the neuron. In another embodiment, determining whether to remove stored data associated with the neuron may include comparing each stored message, stored membrane potential, or other stored data to the global time. In response to the timestamp of the stored message, membrane potential, or the other stored data being earlier than the global time, the neuron may remove the stored message, membrane potential, or other stored data.

Figure 3:
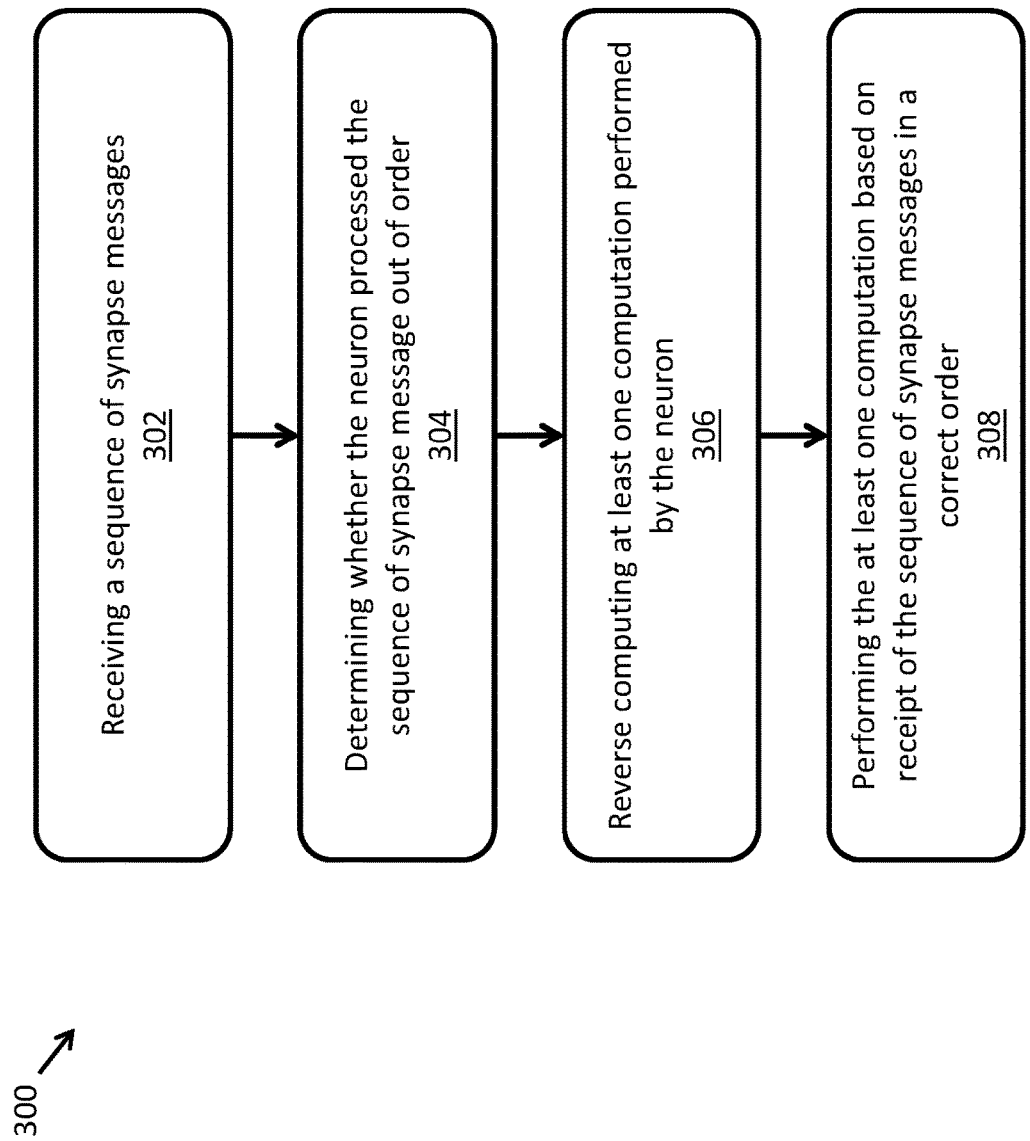
FIG. 3 is a flowchart block diagram illustrating one embodiment of a method for artificial neural network optimistic event processing.

FIG. 3 depicts one embodiment of a method 300. The method 300 may include a computer-implemented method. The method 300 may include a method for artificial neural network optimistic event processing. The method 300 may include receiving 302, at a neuron of an ANN (such as the ANN 100), a sequence of synapse messages. In some embodiments, the sequence of synapse messages may include one or more synapses messages and the order in which the one or more synapse messages arrived at the neuron. Each synapse message may include a timestamp of the time the synapse message was sent. In some embodiments, the neuron may process the synapse messages in the order in which the synapse messages arrive at the neuron. In some embodiments, the synapse messages of the sequence of synapse messages may arrive at the neuron at different times.

In some embodiments, the method 300 may include determining 304, based on the timestamp of each synapse message, whether the neuron processed the sequence of synapse messages out of order with respect to the timestamps. Processing a synapse message may include the neuron performing the voltage integration function based on the voltage of the synapse message, performing the leak function, or the like. In some embodiments, the neuron processing the sequence of synapse messages out of order may include the neuron processing one or more synapse messages of the sequence in an order other than the order in which they were sent. In one embodiment, in response to the neuron process the sequence of synapse messages out of order, the neuron may perform the integration function using an incorrect input, which may result in the neuron firing too early, firing too late, or the like. The neuron firing too early, firing too late, or the like may result in an inaccurate output from the ANN.

In one embodiment, the method 300 may include reverse-computing 306 at least one computation performed by the neuron in response to processing the sequence of synapse messages out of order. Reverse-computing the at least one computation may be known as reversing the at least one computation. The at least one computation may include the voltage integration function, the leak function, or the like. Reverse-computing the at least one computation may include undoing an effect of the computation. In one embodiment, reverse-computing 306 at least one computation performed by the neuron may include reverting the membrane potential of the neuron to the value of the membrane potential before the neuron performed the at least one computation. Reverting the membrane potential of the neuron may include restoring the value of the membrane potential to the value that was stored in response to receiving the out-of-order synapse message. In some embodiments, reverse-computing the at least one computation may include executing a predetermined function that corresponds to the at least one computation. For example, in one embodiment, a neuron may be configured with a certain voltage integration function and may also be configured with a corresponding reverse voltage integration function that undoes the effect of the voltage computation function.

In some embodiments, the method 300 may include performing 308 the at least one computation based on receipt of the sequence of synapse messages in a correct order as determined by the timestamp of each synapse message in the sequence of synapse messages. In one embodiment, the correct order may include an ascending order of timestamps of the sequence of synapse messages. In some embodiments, performing 308 the at least one computation may include the neuron performing the voltage integration function. However, in this embodiment, in response to the neuron processing the sequence of synapse messages in the correct order, the membrane potential of the neuron may be different after each time the neuron performs the voltage integration function than when the neuron performed the voltage integration function on the sequence of synapse messages out of order. In some embodiments, performing 308 the at least one computation may include the neuron performing the leak function or another function.

In one embodiment, reverse 306 computing the at least one computation may include reverse-computing at least one computation corresponding to a first synapse message of the sequence of synapse messages. The first synapse message may include a timestamp after the timestamp of a most-recently received synapse message. Performing 308 the at least one computation in the correct order may include performing a computation corresponding the most-recently received synapse message and the at least one computation in an order with respect to the timestamps of the most-recently received synapse message and the first synapse message.

In one embodiment, the method 300 may include producing at least one anti-message. Producing the at least one anti-message may be in response to reverse-computing a computation. An anti-message may be configured to cancel a message. The anti-message may cancel the message in response to the message having not been yet processed by the receiving component of the ANN. An anti-message may be configured to cause a component of the ANN to reverse-compute a computation. In some embodiments, the anti-message may correspond to the reverse-computed computation the caused the anti-message to be produced.

For example, in response a neuron reverse-computing the voltage integration function (e.g., in response to processing one or more synapse messages out of order), the neuron may send one or more anti-messages to two downstream neurons. The first downstream neuron may receive the anti-message, determine that it has not yet processed the message from the upstream neuron, and may cancel the message from the upstream neuron. The cancelled message may correspond to the voltage summation function that was reverse-computed by the upstream neuron (e.g., the upstream neuron produced the message in response to the resulting membrane potential exceeding the threshold membrane potential). Cancelling the message may include removing the message from a queue of messages waiting to be processed by the downstream neuron.

Continuing the example, the second downstream neuron may have processed the message from the upstream neuron prior to receiving the anti-message from the upstream neuron. In response to receiving the anti-message, the second downstream neuron may reverse-compute a computation that was triggered by the upstream neuron's message. In some embodiments, in response to reverse-computing the computation, the second downstream neuron may send one or more of its own anti-messages.

Figure 4:
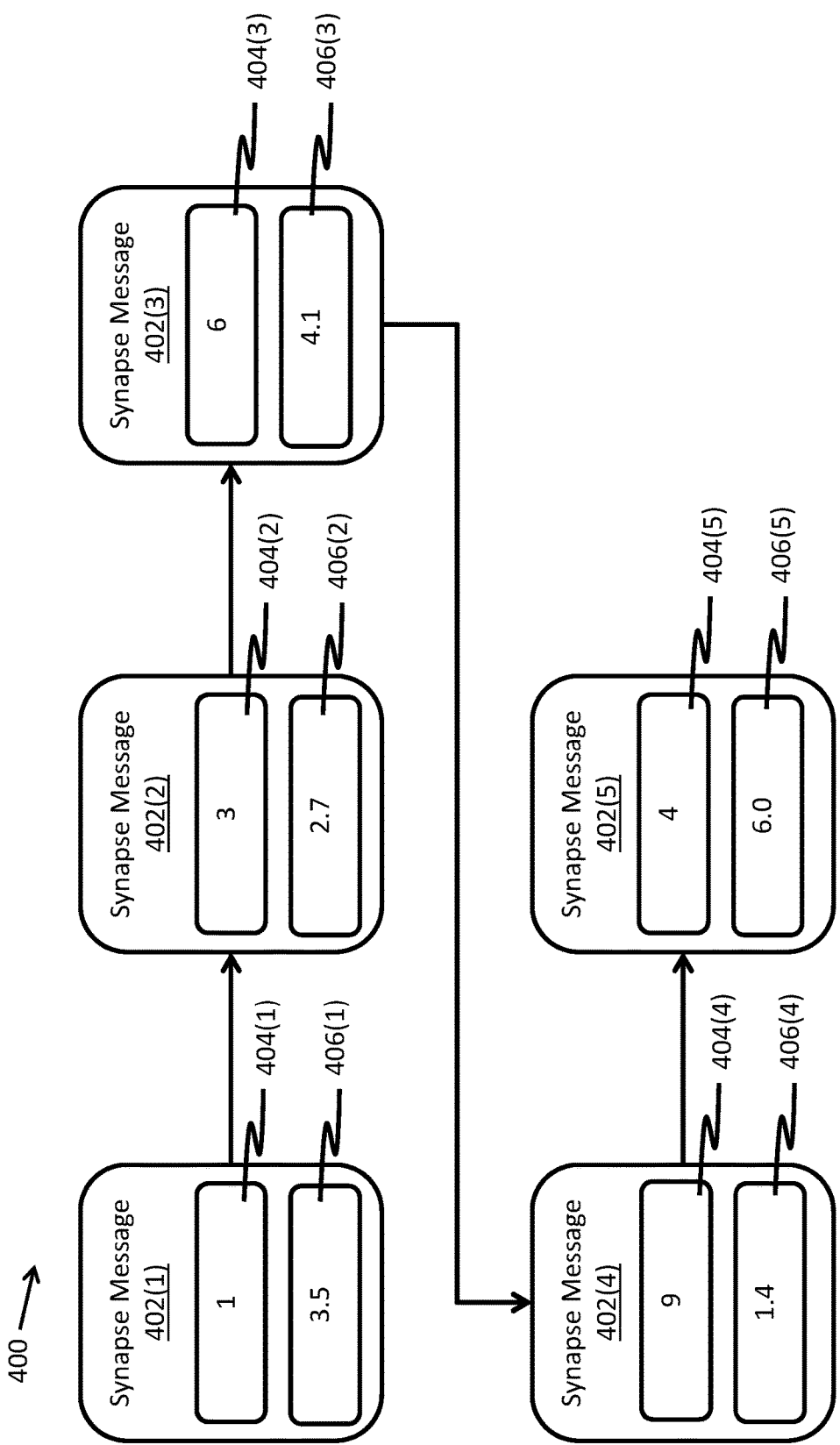
FIG. 4 is a schematic block diagram depicting one embodiment of a sequence of synapse messages.

FIG. 4 depicts one embodiment of a sequence 400 of synapse messages received by a neuron. The sequence 400 may include the synapse messages 402(1)-(5). Each synapse message 402 may include a timestamp 404 and a voltage value 406. The sequence 400 may include the order the neuron received the synapse messages 402. In the example, the neuron received synapse message 402(1) first, then synapse message 402(2), then synapse message 402(3), then synapse message 402(4), and then the most recently received synapse message 402(5). Before the neuron received the synapse message 402(5), the neuron received the synapse messages 402(1)-(4) in a correct order (as indicated by the ascending order of the timestamps 404(1)-(4)). However, the synapse message 402(5) includes the timestamp 404(5) with a value before the value of the timestamp 404 of at least one of the previously received synapse messages 402 (i.e. in the example of FIG. 4, the synapse messages 402(3) and 402(4)). This indicates that the neuron received the sequence 400 of synapse messages out of order.

In response, the neuron may reverse-compute the computations it performed in response to processing the synapse messages 402(3) and 402(4). Reverse-computing the computations may include reverting the membrane potential to the value of the membrane potential of the neuron before receiving the synapse message 402(3). In response to performing the reverse-computations, the neuron may perform the computations corresponding to the synapse messages 402(3)-(5) that it has received in the order indicated by the timestamps 404(3)-(5). In some embodiments, performing the computations may include determining, after performing the integration function, whether the membrane potential of the neuron exceeds the threshold membrane potential of the neuron.

In some embodiments, in response to reverse-computing the computations corresponding to the synapse messages 402(3) and 402(4), the neuron may send one or more anti-messages. For example, in response to receiving the synapse message 402(3), the neuron may have used the voltage value 406(3) as input for its integration function. In response, the neuron may have determined that its resulting membrane potential exceeded its threshold membrane potential and may have sent a firing message to a second synapse to be received at a second neuron. However, since the synapse message 402(5) should have been received before the synapse message 402(3), the neuron may have sent a firing message at the incorrect time and, thus, may have adjusted its membrane potential with the incorrect voltage value 406, or the like. In response, the neuron reverse-computing the computation corresponding to the synapse message 402(3) may include sending an anti-message corresponding to the firing message sent to the synapse. The synapse may receive the anti-message, reverse-compute any corresponding computations, and may send one or more anti-messages in response to one or more synapse messages corresponding to the reverse computations.

In another embodiment, a neuron and one or more connecting synapses downstream from the neuron may perform a fan-out message delivery method. The fan-out delivery method may include the following. A first neuron may be coupled to one or more downstream synapses. A downstream synapse may include a synapse that receives a firing message from the first neuron. A downstream synapse may be coupled to a second neuron and the second neuron may be downstream from the first neuron. In one embodiment, a method may include producing, at the first neuron, a firing message. The firing message may be for a synapse of the one or more downstream synapses. In one embodiment, a "firing message being for a synapse" may include the firing message having the synapse as its destination, target, or the like. Producing the firing message may include the first neuron producing an output. In one embodiment, in response to the synapse receiving the firing message, the method may include producing a synapse message for the second neuron. The method may include producing the firing message for a second synapse of the one or more downstream synapses. In one embodiment, producing the synapse message for the second neuron and producing the firing message for the second synapse may include a synapse producing the synapse message and the firing message. Each synapse producing these two messages (in some embodiments, with the exception of the last synapse not producing the firing message) may result in fewer total messages being produced and may result in lower memory usage.

Figure 5:
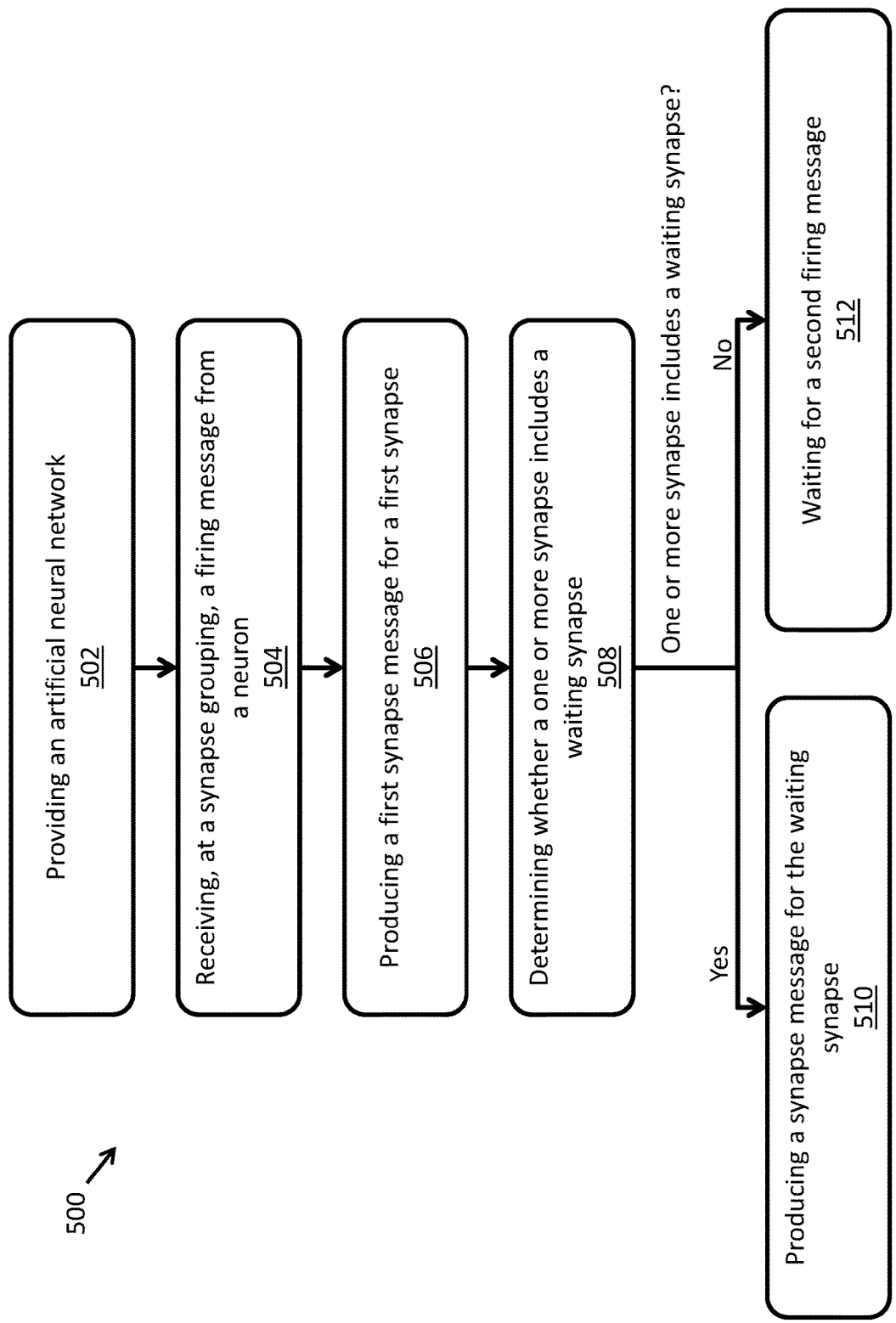
FIG. 5 is a flowchart block diagram illustrating one embodiment of a method for artificial neural network optimistic event processing.

FIG. 5 depicts one embodiment of a method 500. The method 500 may include a computer-implemented method. The method 500 may include a method for artificial neural network optimistic event processing. In one embodiment, the method 500 may include providing 502 the ANN (such as the ANN 100). The ANN may include a synapse group. The synapse group may include one or more synapse. The one or more synapse may be coupled to a neuron. The one or more synapse may be downstream of the neuron.

In one embodiment, the synapse group may include a logical process (explained below). The logical process may include the one or more synapse. In some embodiments, the one or more synapse may include synapses downstream from a single neuron or multiple neurons. In one embodiment, the synapses may include all synapses downstream of a single neuron or a portion of the synapses downstream of a single neuron. The synapse group logical process may receive one or more messages destined for a synapse included in the synapse grouping.

In one embodiment, the method 500 may include receiving 504, at the synapse group, a firing message from the neuron. The firing message may include an output of the neuron. The firing message may include a value of the output of the neuron. In some embodiments, the method 500 may include, in response to receiving the firing message, producing 506 a first synapse message for a first synapse of the one or more synapse. As used herein, a "synapse message for a first synapse" may include a synapse message originating from the first synapse. The first synapse message may include the value of the output of the upstream neuron adjusted based on the weight of the first synapse.

In some embodiments, the method 500 may include determining 508 whether the one or more synapse includes a waiting synapse. In one embodiment, the waiting synapse may include a synapse that has not had a respective synapse message produced for it in response to the firing message. In one embodiment, in response to determining that the one or more synapse includes the waiting synapse, the method 500 may include producing 510 the synapse message for the waiting synapse. Producing 510 the synapse message may include scheduling the synapse message to be sent at a later time. In some embodiments, producing 510 the synapse message may be similar to producing 210 the firing message.

In some embodiments, in response to determining that the one or more synapse does not include at least one waiting synapse, the method 500 may include waiting 512, at the synapse group, for a second firing message from the neuron. In one embodiment, waiting 512 at the synapse group does not necessarily include the synapse group doing nothing, idling, or the like. For example, the synapse group may receive firing messages from other neurons and may process those firing messages.

Figure 6:
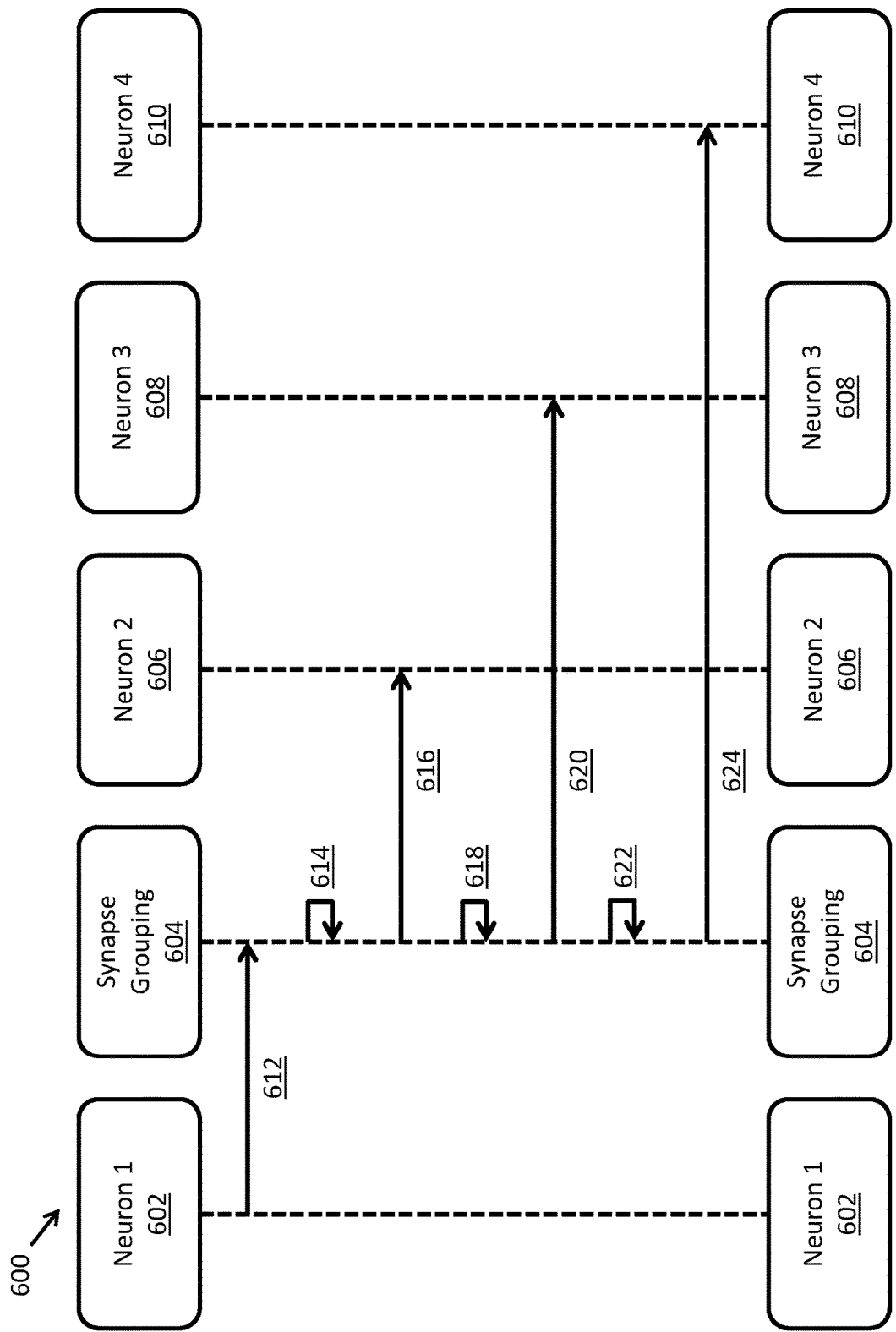
FIG. 6 is a schematic flow diagram depicting one embodiment of an example process of a synapse group processing for an artificial neural network.

FIG. 6 depicts a flow diagram 600 of one embodiment of a synapse group processing a firing message received from a neuron. The flow diagram 600 includes first neuron 602, a synapse group 604, a second neuron 606, a third neuron 608, and a fourth neuron 610. The first neuron 602 is upstream from the second, third, and fourth neurons 606, 608, 610 and is connected to each of these neurons through a first, second, and third, synapse. The synapse group 604 includes the first, second, and third synapses.

The flow begins, and at 612, the first neuron 602 sends a firing message to the synapse group 604. The voltage of the firing message may include a value of 1.4. At 614, the synapse group 604 may adjust the voltage of the firing message based on the weight of the first synapse of the synapse group 604. In this embodiment, adjusting the voltage of the firing message may include multiplying the voltage by the weight of the first synapse. The weight of the first synapse may include a value of 0.6. In response, the resulting voltage includes the value of 0.84. At 616, the synapse group 604 may produce a first synapse message for the first synapse. The first synapse message may include the resulting voltage value of 0.84. The first synapse message may be destined for the second neuron 606.

At 614 or after 616, the synapse group 604 may determine whether the first, second, and third synapses include a waiting synapse. In response to the second and third synapses not having yet sent a synapse message in response to the synapse group 604 receiving the firing message from the first neuron 602, the synapse group 604 may determine that first, second, and third synapses do include a waiting synapse.

At 618, the synapse group 604 may adjust the voltage of the firing message based on the weight of the second synapse by multiplying the voltage of the firing message (1.4) by the weight of the second synapse (in this example, 1.1). At 620, the synapse group 604 may produce a synapse message with the resulting voltage of 1.54 destined for the third neuron 608. At 618 or after 620, the synapse group 604 may determine whether the first, second, and third synapses include a waiting synapse. The synapse group 604 may determine that the third synapse is a waiting synapse.

At 622, the synapse group 604 may adjust the voltage of the firing message based on the weight of the third synapse by multiplying the voltage of the firing message (1.4) by the weight of the third synapse (in this example, 0.8). At 624, the synapse group 604 may produce a synapse message with the resulting voltage of 1.12 destined for the fourth neuron 610. At 622 or after 624, the synapse group 604 may determine whether the first, second, and third synapses include a waiting synapse. In response to the first, second, and third synapses having each sent a synapse message in response to the firing message from the first neuron 602, the synapse group 604 may determine that the first, second, and third synapses do not include a waiting synapse. In response, the synapse group 604 may wait for a second firing message.

In one embodiment, using a synapse group logical process instead of one logical process per synapse may reduce the amount of memory used by logical processes. This may allow embodiments with a larger ANN, which may be able to perform more accurately, faster, more efficiently, or the like. Using a synapse group logical process may reduce the number of synapse messages sent between processing cores, over the data network, or the like. This may reduce congestion over the system bus, data network, or the like, which may decrease the chances of a message arriving at a logical process late, and thus, may decrease the number of times a logical process may perform reverse computations.

Figure 7:
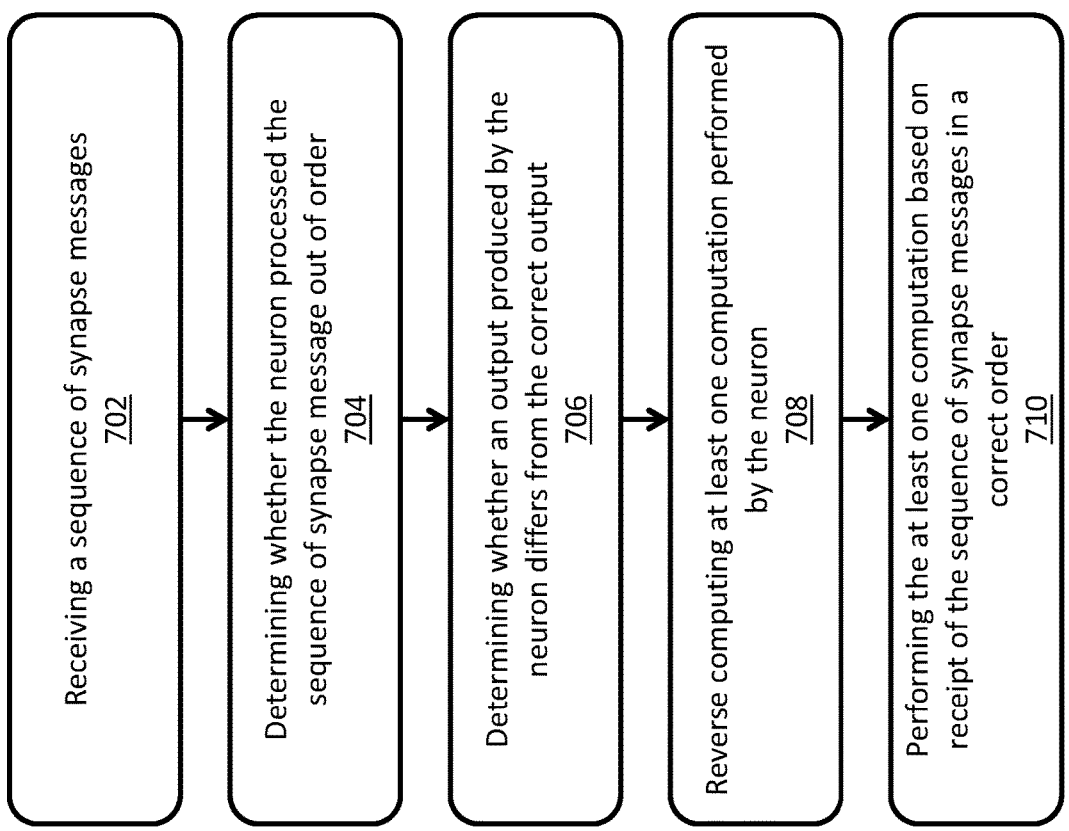
FIG. 7 is a flowchart block diagram illustrating one embodiment of a method for artificial neural network optimistic event processing.

FIG. 7 depicts one embodiment of a method 700. The method 700 may include a computer-implemented method. The method 700 may include a method for artificial neural network optimistic event processing. The method 700 may include receiving 702, at a neuron of an artificial neural network, a sequence of synapse messages. Each synapse message may include a timestamp of the time the synapse message was sent. In one embodiment, receiving 702 the sequence of synapse messages may be similar to the step of receiving 302 the sequence of synapse messages of the method 300. The neuron may be configured to produce a correct output when the neuron processes the synapse messages in a correct order with respect to the timestamps of the synapse messages. The correct output may include a firing message sent at a certain time and with a certain voltage that would result from the neuron processing the sequence of synapse messages in a correct order as indicated by the timestamps of the synapse messages.

In some embodiments, the method 700 may include determining 704, based on the timestamp of each synapse message, whether the neuron processed the sequence of synapse messages out of order with respect to the timestamps. In one embodiment, determining 704 whether the neuron processed the sequence of synapse messages out of order may be similar to the step of determining 304 whether the neuron processed the sequence of synapse messages out of order of the method 300.

In one embodiment, in response to the neuron processing the sequence of synapse messages out of order, the method 700 may include determining 706 whether an output produced by the neuron in response to processing the sequence of synapse messages out of order (i.e. "the actual output") differs from the correct output. An output may include a firing message produced by the neuron. In some embodiments, a neuron may process a sequence of synapse messages out of order, but it may not cause the actual output to be substantially different from the correct output. In response to the actual output not being substantially different from the correct output, the neuron may discard the out of order message.

For example, a neuron may receive a first synapse message with a timestamp of "4." The neuron may process the first synapse message by adjusting its membrane potential based on the voltage of the first synapse message and the voltage integration function of the neuron. Next, the neuron may determine that the membrane potential of the neuron exceeds the threshold membrane potential and may produce a firing message. The firing message may include a voltage. The voltage may include a constant value that the neuron includes each firing message and may not be based on the neuron's membrane potential at the time of producing the firing message. Next, the neuron may receive a second synapse message with a timestamp of "3," which may indicate that the second synapse message should have been received before the first synapse message. However, since the voltage of the firing message would have been the same whether the neuron had received both synapse messages, or only one, the actual output of the neuron may not have been affected by the neuron processing the out-of-order synapse messages. In response, the neuron may discard the second synapse message.

In another example, processing the sequence of synapse messages may cause the actual output to differ from the correct output. For example, a neuron may receive a first synapse message with a timestamp of "7." The neuron may process the first synapse message by adjusting its membrane potential based on the voltage of the first synapse message and the voltage integration function of the neuron. Next, the neuron may calculate a leak voltage and add it to the membrane potential. Next, the neuron may determine that the membrane potential of the neuron does not exceed the threshold membrane potential (and, thus, the neuron does not produce a firing message). Next, the neuron may receive a second synapse message with a timestamp of "3," which may indicate that the second synapse message should have been received before the first synapse message. Furthermore, the second synapse message may include a voltage that, if the neuron had received the second synapse message earlier, would have caused the membrane potential of the neuron to exceed the threshold membrane potential (and, thus, produce a firing message) earlier. Thus, the actual output differs from the correct output.

In some embodiments, in response to the output produced by the neuron differing from the correct output, the method 700 may include reverse-computing 708 at least one computation performed by the neuron in response to processing the sequence of synapse messages out of order. In one embodiment, the method 700 may include performing 710 the at least one computation based on receipt of the sequence of synapse messages in the correct order to produce the correct output. Reverse-computing 708 the at least one computation and performing 710 the at least one computation may be similar to the steps of reverse-computing 306 the at least one computation performed by the neuron and performing 308 the at least one computation of the method 300, respectively.

In one embodiment, the output produced by the neuron in response to processing the sequence of synapse message out of order may differ from the correct output for a variety of reasons. In some embodiments, the actual output being different from the correct output may include the neuron producing the output at a time different than a time the neuron would have produced the correct output. In another embodiment, the actual output differing from the correct output may include the neuron producing the output with a voltage of a firing message different than a voltage of a firing message of the correct output. For example, a neuron may receive a first synapse message with a timestamp of "5" and a second synapse message with a timestamp of "7." The neuron may process the first and second synapse messages and adjust its membrane potential based on the voltages of the first and second synapse messages and the voltage integration function of the neuron. The adjusted membrane potential may be 13.4. The neuron may determine that the membrane potential 13.4 exceeds the threshold membrane potential and produce a firing message. The firing message may include the voltage 13.4. Afterwards, the neuron may receive a third synapse message with a timestamp of "6." Had the neuron received the first, second, and third synapse messages in the correct order, the firing message would have included a voltage of 15.3. Thus, in this example, the actual output includes the voltage 13.4 and the correct output would have included the voltage 15.3, and thus the actual output differs from the correct output.

In one embodiment, a neuron may discard a received out of order synapse message for a variety of reasons. The neuron may discard a received synapse message in response to the actual output of the neuron not substantially differing from the correct output, as explained above. The neuron may discard a received synapse message in response to a user configuration of the neuron, the ANN, or other component of the ANN. The neuron may discard a received synapse message in response to the time difference between the timestamp of the message and the time the message arrived at the neuron being more than a threshold time difference. For example, the threshold time difference may include 10. In response to the timestamp of the received synapse message being 7 and the time the message arrived at the neuron being 23, the difference may be 15, which is more than the threshold time difference of 10. In response, the neuron may discard the received synapse message.

Figure 8:
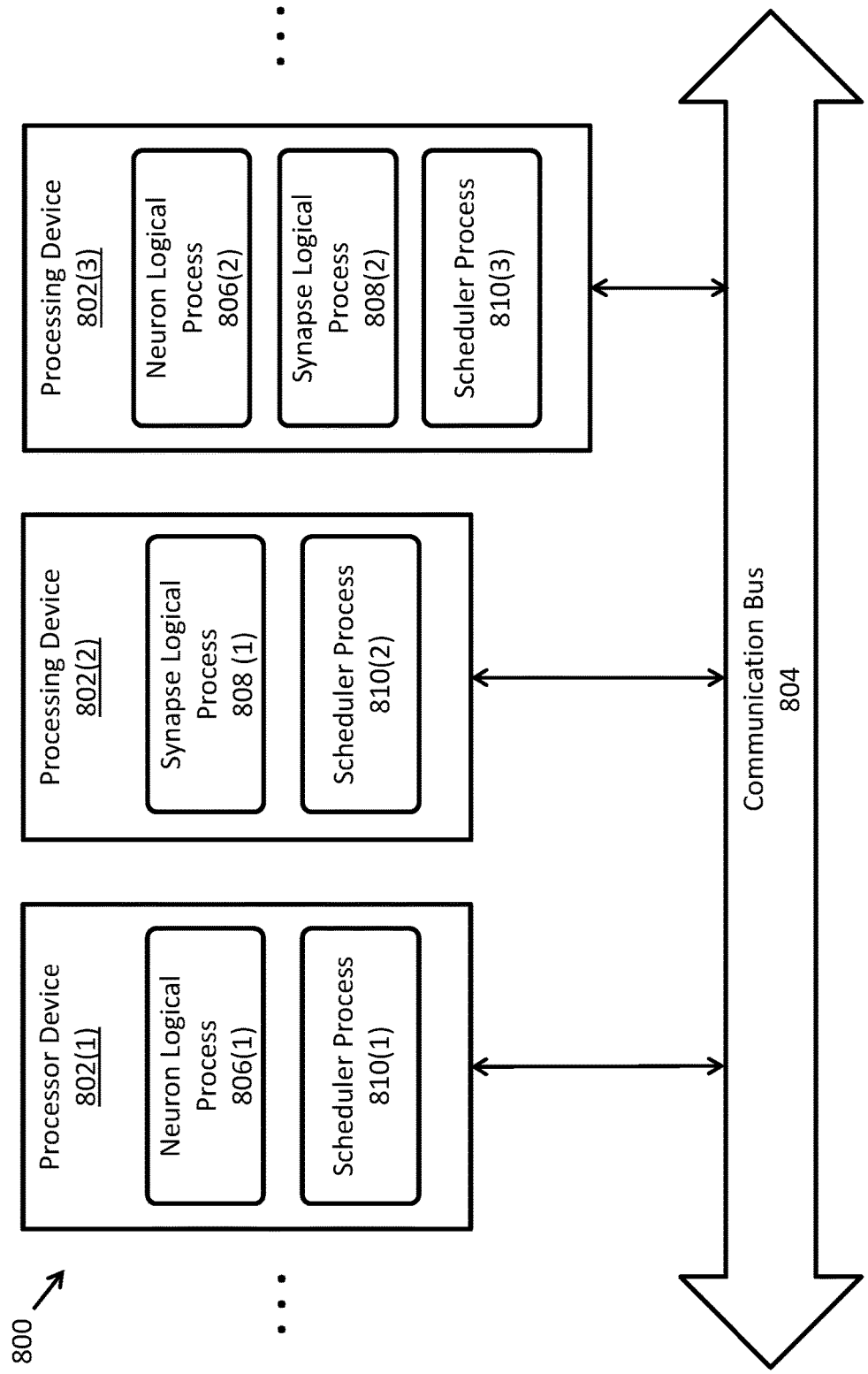
FIG. 8 is a schematic block diagram illustrating one embodiment of a system for neural network optimistic event processing.

FIG. 8 depicts one embodiment of a system 800. In one embodiment, the system 800 may include one or more processor devices 802, such as the processor devices 802(1)-(3) of the FIG. 8. The one or more processor devices 802 may include at least two processor devices 802(1)-(2). A processor device 802 may be in data communication with at least one other processor device 802. A processor device 802 may be in data communication with another processor device 802 through a communication bus 804.

In one embodiment, a processor device 802 may include a central processing unit (CPU) (including a CPU core), a graphics processing unit (GPU), a multi-core processor, a dataflow engine, or the like. A processor device 802 may include an application-specific integrated circuit (ASIC). A processor device 802 may include an asynchronous processor. Examples of an asynchronous processor may include a neuromorphic processor, a non-Von Neumann-type processor, or the like. The system 800 may include multiple types of processor devices 802. A processor device 802 may execute one or more processes, software modules, program instructions, or the like.

In one embodiment, a logical process may include a computer process, computer program, software module, program instructions, a portion thereof, or the like. A logical process may include a component of the ANN. For example, in one embodiment, a logical process may include a neuron. A logical process that includes a neuron may be called a "neuron logical process" 806. In another embodiment, a logical process may include a synapse. A logical process that includes a synapse may be called a "synapse logical process" 808.

In some embodiments, a logical process may communicate with another logical process through a message. The message may include data, a timestamp of the time the message was sent, or the like. A message may be similar to a message as described above in relation to synapse messages, firing messages, or the like. A message may be sent between logical processes executing on the same processor device 802. A message may be sent between logical processes executing on different processor devices 802 through the communication bus 804. The communication bus 804 may include one or more software or hardware components that may communicate a message from one processor device 802 to another processor device 802. For example, the communication bus 804 may include circuitry between two processor devices 802 that reside on the same computing device, a data network connecting different computing devices, or the like.

In one or more embodiments, a logical process may be configured to perform one or more steps, functions, or the like. The logical process may perform these steps, functions, or the like in response to being executed by a processor device 802. In some embodiments, the steps, functions, or the like may include one or more steps of the method 200, the method 300, the method 500, the method 700, or the like.

In some embodiments, the system 800 may include one or more neuron logical processes 806, such as the neuron logical processes 806(1)-(2) of the FIG. 8. The one or more neuron logical processes 806 may include at least two neuron logical processes 806. A neuron logical process 806 may include a neuron of an artificial neural network (ANN), such as the ANN 100. A processor device 802 may include a neuron logical process 806 executing on the processor device 802.

In some embodiments, the system 800 may include one or more synapse logical processes 808, such as the synapse logical processes 808(1)-(2) of the FIG. 8. A synapse logical process 808 may include a synapse of an ANN. The synapse may connect to a neuron of a neuron logical process 806. A processor device 802 may include the synapse logical process 808 and may execute the synapse logical process 808. The synapse logical process 808 may send one or more synapse messages to a neuron logical process 806. The synapse logical process 808 may receive a firing message from a neuron logical process 806.

In some embodiments, the system 800 may include multiple processor devices 802, each processor device 802 executing at least one neuron logical process 806 or synapse logical process 808. In one embodiment, a processor device 802 may include multiple logical processes executing on the processor device 802. For example, as depicted in FIG. 8, the processor device 802(3) may execute the neuron logical process 806(2) and the synapse logical process 808(2). More than one logical process of the same type may execute on a single processor device 802. The number of processor devices 802, logical processes, or the like of the system 800 may include tens, hundreds, thousands, millions, or the like. In one embodiment, the system 800 may include a supercomputer, compute cluster, or the like. The system 800 may be configured to perform one or more functions of an ANN such as training, a hyperparameter search, inference calculations, or the like.

In one embodiment, a neuron logical process 806 may be executed by a processor device 802. The neuron logical process 806, when executed by the processor device 802, may be configured to perform one or more steps, functions, or the like. In some embodiments, the neuron logical process 806 may be configured to receive a first synapse message. The first synapse message may include a voltage. In one embodiment, the neuron logical process 806 being configured to receive the first synapse message may be similar to receiving 202 a synapse message of the method 200.

In some embodiments, the neuron logical process 806 may be configured to adjust a membrane potential of the neuron of the neuron logical process 806. The logical process 806 may adjust the membrane potential based on the voltage of the synapse message that the neuron logical process 806 received. In some embodiments, the neuron logical process 806 adjusting the membrane potential of the neuron may be similar to adjusting 206 the membrane potential of the neuron of the method 200.

In one embodiment, the neuron logical process 806 may be configured to determine whether the membrane potential of the neuron exceeds a threshold membrane potential of the neuron. In some embodiments, the neuron logical process 806 may be configured to determine whether the membrane potential of the neuron exceeds a threshold membrane potential of the neuron may be similar to determining 208 whether the membrane potential exceeds the threshold membrane potential of the method 200.

In some embodiments, in response to the membrane potential of the neuron exceeding the threshold membrane potential, the neuron logical process 806 may be configured to produce an output. The output may include a firing message. In one embodiment, the neuron logical process 806 may be configured to produce the output without receiving a second synapse message from a connecting, upstream synapse. In some embodiments, a neuron logical process 806 may receive one or more synapse messages from one or more synapse logical processes 808, and the synapses of the one or more synapse logical processes 806 may be upstream and connected to the neuron of the neuron logical process 806. The neuron may receive one or more synapse messages from some, but not all, the upstream, connected synapses. However, based on at the voltages of the synapse messages the neuron has received, the neuron may determine that the neuron's membrane potential exceeds the threshold membrane potential of the neuron. Thus, the neuron may not need to wait to receive a synapse message from the other upstream, connected synapses to produce an output. In one embodiment, a neuron may not need to wait until other neurons in the same layer have determined whether their respective membrane potentials exceed their respective threshold membrane potentials to send a firing message.

In some embodiments, the system 800 may include one or more scheduler processes 810, such as the scheduler processes 810(1)-(3). Each processor device 802 may include a scheduler process 810. Each scheduler process 810 may be configured to determine an execution order for at least one logical process executing on the processor device 802.

In one embodiment, a scheduler process 810 may include a computer process or the like that schedules one or more processes to execute on the processor device 802. The scheduling may include ordering the processes in an execution order. The execution order, how long each process runs during its scheduled time, or the like may be based on system 800 configurations, processor device 802 configurations, operating system configurations, or the like. In some embodiments, multiple logical processes may execute on a single processor device 802. For example, as depicted in FIG. 8, the processor device 802(3) may include a neuron logical process 806(2) and a synapse logical process 808(2). The scheduler process 810(3) of the processor device 802(3) may determine in what order the neuron logical process 806(2), the synapse logical process 808(2), and other processes executing on the process device 802(3) may execute, how long each process may execute, or the like.

In one embodiment, a scheduler process 810 may be configured to determine, based on a timestamp of a synapse message of a sequence of synapse messages, whether the neuron logical process executing on the processor device of the scheduler process received the sequence of synapse messages out of order with respect to the timestamps. A processor device 802, a neuron logical process 806, or the like may receive a sequence of synapse messages. The processor device 802, a neuron logical process 806, or the like may receive the sequence of synapse messages faster than the neuron logical process 806 may process them. However, the sequence of synapse messages may arrive out of order with respect to the timestamp of each synapse message. In some embodiments, in response to determining that the neuron logical process 804 received sequence of synapse messages out of order, the scheduler process 810 may sort the sequence of synapse messages received by the neuron logical process 806 in a correct order as indicated by the timestamps of the sequence of synapse messages.

For example, the processor device 802(1) may receive three synapse messages. The timestamp of the first synapse message may include the time "4," the timestamp of the second synapse message may include the time "7," and the timestamp of the third synapse message may include the time "5." The neuron logical process 806(1) may be processing other received messages and may not begin processing the first, second, or third synapse messages immediately upon receipt. The scheduler process 810(1) may sort the first, second, and third synapse messages. In response, the neuron logical process 806(1) may, in response to finishing processing its previous messages, process the first synapse message, then the third synapse message, and then the second synapse message.

In another example, the processor device 802(1) may receive three synapse messages. The timestamp of the first synapse message may include the time "4," the timestamp of the second synapse message may include the time "7," and the timestamp of the third synapse message may include the time "5." However, the processor device 802(1) may receive the third synapse message much later than the first and second synapse messages. In response, the neuron logical process 806(1) may process the first and second synapse messages before processing the third synapse message. The neuron logical process 806(1), in response to determining that the neuron logical process 806(1) received the first, second, and third synapse messages out of order, may reverse-compute the second synapse message and may send a corresponding anti-message as described in relation to the method 300.

In some embodiments, an ANN may include an axon. The axon may connect to a neuron and may be downstream from the neuron. The axon may connect to the one or more downstream synapses of the neuron. In one embodiment, a logical process for an axon (i.e. an "axon logical process") may receive a firing message from the neuron. The axon logical process may send the firing message to each connecting downstream synapse logical process, synapse group logical process, or the like. In some embodiments, by using an axon logical process, a neuron logical process may not send a message to each connecting downstream neuron, but only to the downstream connecting axon. This may allow the neuron logical process to use less time, memory, processing time, or the like producing and sending messages, and more time processing received messages, reverse-processing, or the like.

In some embodiments, the ANN discussed herein may differ from a simulated ANN. A simulation is concerned with a subset of the behavior of an ANN. The subset behavior may include behavior being tested to determine whether the theoretical behavior may occur in an actual implementation. As a result, a simulated ANN simulates a portion of the data used to execute an implementation of an ANN. For example, a simulated ANN does not include overhead data or overhead processing used to configure the implemented ANN. Overhead data may include data used to create a neuron or a synapse, a neuron logical process or synapse logical process, a firing message or a synapse message, or other components of the implementation of the ANN. Overhead processing may include the processing performed by a processor device to create the aforementioned components of the implemented ANN, the processing performed to switch between processes on the processor device, or other processing performed in the execution of the implemented ANN.

A simulated ANN is concerned with the adherence of the simulation to certain conditions in order to test the theoretical behavior. As a result, certain functions of an implementation of an ANN are not present in a simulated ANN. This is because the implementation of an ANN is more concerned with obtaining results and is less concerned with testing correct behavior. For example, in a simulated ANN, a neuron would not determine whether the actual output of the neuron differs from the correct output to determine whether to reverse-compute one or more computations. The simulation would reverse-compute each time a sequence of synapse messages was received out of order because the simulation of the ANN is simulating the neurons of the ANN sending the firing messages at the correct times. Other behaviors of a simulated ANN may not be present in an implemented ANN.

As can be seen from the foregoing embodiments, an ANN of one or more of the embodiments described herein may improve the functionality of a computing device and may include non-conventional steps, functions, components, or arrangements of components.

For example, a neuron of an ANN according to the one or more embodiments may perform its integration function, leak function, or the like in an asynchronous manner. The neuron executing in an asynchronous manner may include the neuron not waiting to receive input from all connected upstream synapses before producing a firing message, unlike a conventional ANN. The neuron executing in an asynchronous manner may include the neuron not waiting for all of the neurons in the same layer to receive all of their respective inputs, unlike a conventional ANN. In some embodiments, this may result in a neuron of the ANN not expending computing resources when the neuron has not received any input, unlike a conventional, synchronous ANN. This may result in a faster execution of one or more functions of the ANN, which is an improvement of computer functionality. This improvement in computer functionality may be due to these non-conventional steps, functions, or components and may not be due to faster computer hardware.

In some embodiments, the neuron process messages from other components of the ANN as they arrive at the neuron, and in the case of a sequence of messages that arrive out of order, the neuron may include the non-conventional steps of reverse-computing the out-of-order messages and processing the messages in a correct order.

As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer readable medium(s) having program code embodied thereon.

In some embodiments, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM" or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processor devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processor device receives computer readable program instructions from the network and forwards the computer readable program instructions for storage in a computer readable storage medium within the respective computing/processor device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute on a supercomputer, a compute cluster, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations or block diagrams of methods, apparatuses, systems, or computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present invention of new and useful METHODS AND SYSTEMS FOR ARTIFICIAL NEURAL NETWORK OPTIMISTIC EVENT PROCESSING, it is not intended that such references be construed as limitations upon the scope of this invention.

What is claimed is:

1. A non-transitory computer-readable storage medium having code stored thereon, wherein the code, when executed by at least one processor, causes the at least one processor to implement a method comprising:

receiving, at a neuron of a trainable and inferencing recurrent neural network (RNN), a sequence of synapse messages, wherein each synapse message comprises a timestamp of the time the synapse message was sent, the neuron configured to produce a first output, wherein the first output includes an output the neuron produces when the neuron processes the synapse messages in a non-descending order with respect to the timestamps of the synapse messages;

determining, based on the timestamp of each synapse message, whether the neuron processed the sequence of synapse messages out of order with respect to the timestamps; and in response to the neuron processing the sequence of synapse messages out of order,
  performing a first reverse-computation comprising reversing at least one computation performed by the neuron in response to processing the sequence of synapse messages out of order,
  performing a first at least one computation comprising performing the at least one computation based on receipt of the sequence of synapse messages in the non-descending order to produce the first output,
  determining whether a second output produced by the neuron in response to processing the sequence of synapse messages out of order differs from the first output, in response to determining that the second output produced by the neuron differs from the first output,
  performing a second reverse-computation, comprising reversing the at least one computation performed by the neuron in response to processing the sequence of synapse messages out of order, and
  performing a second at least one computation comprising performing the at least one computation based on receipt of the sequence of synapse messages in the non-descending order as, determined by the timestamp of each synapse message in the sequence of synapse messages, to produce an updated first output; and in response to determining that the second output produced by the neuron does not differ from the first output, discarding a most recently received synapse message in the sequence of synapse messages.

2. The computer-readable storage medium of claim 1, wherein:
  performing the second reverse computation comprises reverse-computing at least one computation corresponding to a first synapse message of the sequence of synapse messages, wherein the first synapse message includes a timestamp after the timestamp of a most-recently received synapse message; and
  performing the at least one computation in the non-descending order comprises performing a computation corresponding to the most-recently received synapse message and the at least one computation in an order with respect to the timestamps of the most-recently received synapse message and the first synapse message.

3. The computer-readable storage medium of claim 1, wherein performing the second reverse computation comprises reverting a membrane potential of the neuron to the value of the membrane potential before the neuron performed the at least one computation.

4. The computer-readable storage medium of claim 1, wherein the method further comprises:
  producing at least one anti-message corresponding to the second reverse computation, wherein the at least one anti-message is configured to cancel a message sent in response to the at least one computation.

5. The computer-readable storage medium of claim 1, wherein the method further comprises producing at least one anti-message corresponding to the second reverse computation, wherein a second neuron of the RNN is configured to reverse-compute a second at least one computation in response to receiving the anti-message.

6. The computer-readable storage medium of claim 1, wherein the method further comprises:
  adjusting a membrane potential of the neuron in response to receiving the sequence of synapse messages;
  determining whether the membrane potential of the neuron exceeds a threshold membrane potential of the neuron; and
  in response to the membrane potential exceeding the threshold membrane potential,
    producing a firing message, wherein producing the firing message comprises the neuron producing an output, and
    reducing the membrane potential of the neuron by a predetermined amount.

7. The computer-readable storage medium of claim 6, wherein the adjusting the membrane potential of the neuron further comprises adding a random amount to the membrane potential.

8. The computer-readable storage medium of claim 6, wherein the method further comprises:
  calculating a time difference between the current time and a time the neuron last produced a firing message;
  calculating a leak voltage amount based on the time difference; and
  adjusting the membrane potential of the neuron based on the leak voltage amount.

9. The computer-readable storage medium of claim 8, wherein the calculating the leak voltage amount comprises calculating, based on random number generation, a negative amount for the leak voltage amount.

10. The computer-readable storage medium of claim 6, wherein the method further comprises:
  determining whether the membrane potential of the neuron is below a second threshold membrane potential; and
  in response to the membrane potential being below the second threshold membrane potential, setting the membrane potential to a predetermined membrane potential.

11. The computer-readable storage medium of claim 6, wherein the determining whether the membrane potential of the neuron exceeds the threshold membrane potential of the neuron comprises determining whether the membrane potential of the neuron exceeds the threshold membrane potential of the neuron in response to a first predetermined amount of time expiring since adjusting the membrane potential of the neuron, wherein the first predetermined amount of time comprises at least one of:
  a predetermined time interval;
  a predetermined number of processor cycles; or
  a predetermined number of layers in the RNN.

12. The computer-readable storage medium of claim 6, wherein the producing the firing message comprises producing the firing message without receiving a second synapse message from a connecting, upstream synapse.

13. The computer-readable storage medium of claim 1:
wherein
the neuron is a first neuron coupled to one or more downstream synapses, wherein a downstream synapse is a synapse that receives a firing message from the first neuron, and
a synapse of the one or more downstream synapses is coupled to a second neuron; and
wherein the method further comprises
producing, at the first neuron, a firing message for a synapse of the one or more downstream synapses, wherein producing the firing message comprises the first neuron producing an output, and
in response to the synapse receiving the firing message producing a synapse message for the second neuron, and
producing the firing message for a second synapse of the one or more downstream synapses.

14. A computer-implemented method, comprising:
receiving, at a neuron of a trainable and inferencing recurrent neural network (RNN), a sequence of synapse messages, wherein each synapse message comprises a timestamp of the time the synapse message was sent, the neuron configured to produce a first output, wherein the first output includes an output the neuron produces when the neuron processes the synapse messages in a non-descending order with respect to the timestamps of the synapse messages;
determining, based on the timestamp of each synapse message, whether the neuron processed the sequence of synapse messages out of order with respect to the timestamps;
in response to the neuron processing the sequence of synapse messages out of order,
performing a first reverse-computation comprising reversing at least one computation performed by the neuron in response to processing the sequence of synapse messages out of order,
performing a first at least one computation comprising performing the at least one computation based on receipt of the sequence of synapse messages in the non-descending order to produce the first output,
determining whether a second output produced by the neuron in response to processing the sequence of synapse messages out of order differs from the first output;
in response to determining that the second output produced by the neuron differs from the first output,
performing a second reverse-computation, comprising reversing the at least one computation performed by the neuron in response to processing the sequence of synapse messages out of order, and
performing a second at least one computation comprising performing the at least one computation based on receipt of the sequence of synapse messages in the non-descending order to produce an updated first output; and
in response to determining that the second output produced by the neuron does not differ from the first output, discarding a most recently received synapse message in the sequence of synapse messages.

15. The computer-implemented method of claim 14, wherein the second output produced by the neuron in response to processing the sequence of synapse message out of order differs from the first output in response to at least one of:
the neuron producing the second output at a time different than a time the neuron would have produced the first output; or
the neuron producing the second output with a voltage of a firing message different than a voltage of a firing message of the first output.

16. A system, comprising:
at least two neuron logical processes, each neuron logical process including a neuron of a trainable and inferencing recurrent neural network (RNN); and
at least two processor devices, wherein each processor device is in data communication with at least one other processor device of the at least two processor devices, and wherein each processor device includes at least one neuron logical process executing on the processor device;
wherein each neuron logical process, when executed by the processor device, is configured to
receive a sequence of synapse messages, wherein each synapse message comprises a timestamp of the time the synapse message was sent,
produce a first output, wherein the first output includes an output the neuron logical process produces when the neuron logical process processes the synapse messages in a non-descending order with respect to the timestamps of the synapse messages,
determine, based on the timestamp of each synapse message, whether the neuron logical process processed the sequence of synapse messages out of order with respect to the timestamps,
in response to the neuron processing the sequence of synapse messages out of order,
performing a first reverse-computation comprising reversing at least one computation performed by the neuron in response to processing the sequence of synapse messages out of order,
performing a first at least one computation comprising performing the at least one computation based on receipt of the sequence of synapse messages in the non-descending order to produce the first output,
determining whether a second output produced by the neuron in response to processing the sequence of synapse messages out of order differs from the first output;
in response to determining that the second output produced by the neuron differs from the first output,
performing a second reverse-computation, comprising reversing the at least one computation performed by the neuron in response to processing the sequence of synapse messages out of order, and
performing a second at least one computation comprising performing the at least one computation based on receipt of the sequence of synapse messages in the non-descending order to produce an updated first output, and
in response to determining that the second output produced by the neuron does not differ from the first output, discarding a most recently received synapse message in the sequence of synapse messages.

17. The system of claim 16, wherein the plurality of processor devices comprises at least one of:
a central processing unit core; or
an asynchronous processor.

18. The system of claim 16, further comprising a plurality of scheduler processes, wherein each processor device of the plurality of process devices includes a scheduler process of the plurality of scheduler processes, wherein each scheduler process is configured to determine an execution order for at least one logical process executing on the processor device.

19. The system of claim 18, wherein each scheduler process is further configured to determine, based on the timestamp of each synapse message of the sequence of synapse messages, whether the neuron logical process executing on the processor device of the scheduler process received the sequence of synapse messages out of order with respect to the timestamps.

20. The system of claim 16, wherein each neuron logical processing being configured to produce a first output comprises the neuron logical process adjusting a membrane potential of the neuron of the neuron logical process based on the voltage of a synapse message of the sequence of synapse messages.

* * * * *